United States Patent [19]

DuRocher

[11] E Re. 28,595

[45] Reissued Oct. 28, 1975

[54] CURRENT CONTROL APPARATUS AND METHODS OF MANUFACTURE

[75] Inventor: Gideon A. DuRocher, Mount Clemens, Mich.

[73] Assignee: Essex International, Inc., Fort Wayne, Ind.

[22] Filed: Nov. 9, 1972

[21] Appl. No.: 305,132

Related U.S. Patent Documents

Reissue of:

[64] Patent No.: 3,648,002
Issued: Mar. 7, 1972
Appl. No.: 34,320
Filed: May 4, 1970

[52] U.S. Cl. ..... 200/265; 338/114; 339/17 R; 339/61 M

[51] Int. Cl.[2] ..... H01H 3/00; H01R 13/24

[58] Field of Search .... 339/17 R, 17 E, 17 A, 17 C, 339/17 M, 18 R, 18 C, 59 R, 59 M, 61 R, 61 M, 150 R, 150 T, 151 R, 151 M, 154 R, 156 R; 174/68.5; 29/625, 628; 200/265; 338/114

[56] References Cited

UNITED STATES PATENTS

| | | | |
|---|---|---|---|
| 2,044,080 | 6/1936 | Kemper | 338/114 |
| 2,734,978 | 2/1956 | Bulgin | 338/114 |
| 3,011,063 | 11/1961 | Deutschle | 338/114 |
| 3,077,511 | 2/1963 | Bohrer et al. | 174/68.5 |
| 3,094,585 | 6/1963 | Rudner | 174/68.5 |
| 3,243,753 | 3/1966 | Kohler | 338/28 |
| 3,260,907 | 7/1966 | Weller et al. | 339/275 R |
| 3,324,445 | 6/1967 | Miller | 339/61 M |
| 3,386,067 | 5/1968 | Costanzo | 338/114 |
| 3,489,884 | 1/1970 | Waseleski | 219/241 |
| 3,509,296 | 4/1970 | Harshman et al. | 200/46 |
| 3,541,222 | 11/1970 | Parks et al. | 174/68.5 |

*Primary Examiner*—Roy D. Frazier
*Assistant Examiner*—Lawrence Staab
*Attorney, Agent, or Firm*—Learman & McCulloch

[57] ABSTRACT

Current control apparatus operable to function selectively as a conductor, a circuit breaker, or a thermostat comprises a body formed of electrically insulating, compressible, inorganic, preferably elastomeric material having one or more portions thereof provided with discrete, electrically conductive particles which move relatively to one another into and out of engagement in response to changes in the state of compression to which the body is subjected or in response to variations in temperature of the body. The conductive portion or portions of the body extend through the latter from one side to the other, but are electrically isolated from one another by the nonconductive body portions. The body may include upstanding ribs or flanges on either or both of its opposite surfaces for the purpose of providing seals to prevent the entry of moisture or other foreign matter to the area bounded by the flanges.

43 Claims, 15 Drawing Figures

INVENTOR
GIDEON A. DuROCHER

BY
Learman & McCulloch

ATTORNEYS

INVENTOR
GIDEON A. DuROCHER

BY
Learman & McCulloch
ATTORNEYS

CURRENT CONTROL APPARATUS AND METHODS OF MANUFACTURE

Matter enclosed in heavy brackets [ ] appears in the original patent but forms no part of this reissue specification; matter printed in italics indicates the additions made by reissue.

---

The invention disclosed herein relates to apparatus and the manufacture of such apparatus for controlling electric circuits and more particularly to a control device comprising a body formed of electrically insulating, compressible, preferably elastomeric material provided with one or more electrically isolated portions each of which has electrically conductive particles dispersed therethrough which are operable to move into and out of electrically conductive relationship in response to changes in the state of compression of the body or in response to changes in temperature to which the body is subjected. More particularly, the invention relates to a resilient body having portions thereof constituted by a mixture of rubbery, insulating material and electrically conductive particles which portions are adapted to be rendered conductive or nonconductive according to changes in pressure or temperature to which such portions are subjected. The body may be formed to any desired shape and may be provided with upstanding flanges or ribs of deformable material, thereby enabling the electrically conductive portions to be sealed against contamination by moisture or other foreign agents. Apparatus constructed according to the invention is especially useful in establishing electrical continuity between either rigid or flexible printed circuits, between wires and printed circuit conductors, and between conventional terminals of the kind found in circuit connect and disconnect devices, but the apparatus equally well is adapted for use in circuit breakers and thermostats.

An object of this invention is to provide current control apparatus which selectively may be either normally conductive or normally nonconductive and which is convertible from one condition to the other in response to changes in pressure or temperature.

Another object of the invention is to provide current control apparatus having one or more electrically conductive portions forming a unitary part of a body and in which each conductive portion is isolated by nonconductive material.

Another object of the invention is to provide current control apparatus having a resilient body formed of compressible, nonconductive material and which is provided with electrically conductive portions isolated from one another by the nonconductive material, the including self-contained sealing means for protecting the conductive portions against contamination.

A further object of the invention is to provide methods of manufacturing apparatus of the kind described.

Other objects and advantages of the invention will be pointed out specifically or will become apparent from the following description when it is considered in conjunction with the appended claims and the accompanying drawings in which:

FIG. 1 is an isometric view of a control device constructed according to one embodiment of the;

Figure 1:
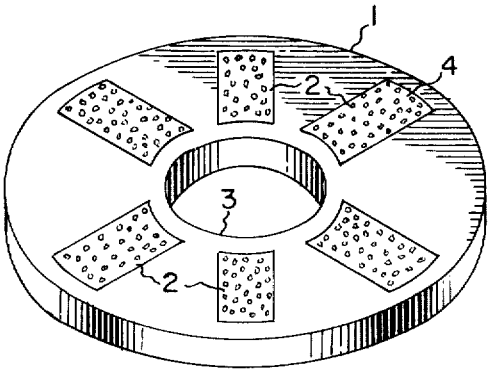

A control device constructed in accordance with the invention comprises essentially a unitary body or pad formed of a synthetic, inorganic, resilient, nonconductive substance such as silicone rubber or polyurethane, body having at least one inlay or portion thereof constituted by nonconductive material such as silicone rubber or polyurethane throughout which is dispersed a quantity of discrete, electrically conductive particles. According to one embodiment of the invention the portion of the pad containing the conductive particles and the dispersion of the particles are such that, when the pad is in its normal, unstressed condition the electrical resistance of the pad is infinite and the pad is nonconductive. When the pad is subjected to compressive force of sufficient magnitude, however, the particles are forced to move relatively to one another into particle-to-particle engagement. The resistance of the pad thereupon changes to that of the metal particles and the pad becomes electrically conductive. Upon release of the compressive force, the inherent resilience of pad restores it to its normal, unstressed condition whereupon the particles again move relatively to one another, but in this instance in such manner as to disengage one another and render the pad nonconductive. The change from conductive to nonconductive condition, and vice versa, occurs rapidly, as is the case with a conventional switch of the snap-action type.

According to another embodiment of the invention the portion of the pad containing the conductive particles is molded under pressure so that when the pad is in its normal, unstressed condition the conductive particles are in conductive engagement, thereby rendering that portion of the pad electrically conductive without the application of an external compressive force. The nonconductive material has a coefficient of thermal expansion which is substantially greater than that of the metal particles so that, when the temperature of the pad is raised, either by current flow or by an increase in ambient temperature, the nonconductive material expands at a greater rate than that of the conductive particles so as to cause the particles to move apart and render the pad nonconductive. Upon cooling of the pad, the thermally expanded material will contract, thereby inherently returning the conductive particles into conductive engagement.

The number of particles which move into particle-to-particle engagement may vary according to the force applied to the body or to the compressive force under which it is formed, and it is not essential that all of the particles engage one another. It is only necessary that a train of particles be in engagement between the other current conductors of a circuit so as to establish a conductive path through the body. In fact, it is preferred that not all of the particles in the body engage one another. In such a case, one train of engaged particles may be consumed by an overload current, thereby rendering the body nonconductive. Other particles, however, will be unaffected thereby making it possible for such other particles to form additional trains for current conduction.

An advantage of devices of the kind herein disclosed is the ease with which they may be varied to conform to differing operating requirements. In general, the compressive force required to render a composite body portion conductive will be directly proportional to the thickness of the pad. A given sample of the composite body or pad, therefore, can be made responsive to extremely light pressures or responsive to relatively heavy pressures, depending on the thickness of the pad. The sensitivity of the device also is related to the quantity and size of the conductive particles. The force required to render a pad conductive varies, in general, inversely according to the quantity of particles contained within the pad and varies directly according to the size of such particles. It is possible, therefore, to manufacture devices having greatly differing operating characteristics.

The force required to render a composite body portion conductive, and the amount of travel necessary to effect compression of the body portion to a state of conductivity also is related to the density of the body. Thus, a relatively dense body requires the application of a greater compressive force than does a less dense or foamed body, whereas the foamed body requires a greater compressive movement than does the more dense body. Consequently, the force and stroke of an operating mechanism can vary within wide limits.

The material from which the device is made should be resilient at both low and high temperatures, readily moldable, stable at high temperatures, porous or nonporous, resistant to ozone, oil and arcing, inorganic semiinorganic durable, low in carbon content, and have high dielectric strength. Certain kinds of polyurethanes and silicone rubbers possess all of these properties. Silicone rubbers are prepared by milling together a dimethyl silicone polymer, an inorganic filler, and a vulcanizer or catalyst. Many different fillers may be used, such as titania, zinc oxide, iron oxide, silica, and the like. The type and amount of filler used alters the chemical, physical, and electrical properties. It is possible, therefore, to produce many different kinds of silicone rubbers which have the properties referred to above.

Many varities of silicone rubbers exist which perform satisfactorily. For example, good results have been obtained with silicone rubbers formed by combining resins 850 or 3120 (Dow Corning Corporation, Midland, Michigan) with the manufacturer's recommended S, F or H catalyst or vulcanizer which includes as its active ingredients such compounds as dibutyl tin dilorate or stanis octoate. Satisfactory results also have been obtained with silicone rubbers formed by combining RTV-7 resin (General Electric Company, Schenectady, New York) with the manufacturer's Nuocure 28 vulcanizer. Metallic particles are stirred into the resin-catalyst substances in sufficient quantity to be dispersed substantially uniformly throughout the mass. The mixture then is poured into a mold and cured in the manner prescribed for the particular resin. Polyurethane devices are made in the same way, but utilizing the appropriate resins and catalysts. The mold may be any desired shape to produce a composite solid or foamed body composed of the elastomeric material and the metal particles, the latter being dispersed throughout the body, including its outer surfaces.

The metal particles should be formed of a metal that has excellent conductive properties and also should be one which, if it oxidizes, has an electrically conductive oxide. Particles made from noble metals such as silver and gold have the desired inherent conductivity and normally form conductive oxides, but particles composed entirely of noble metal are quite expensive. It is preferred, therefore, to use discrete, spherical metal particles composed of base metals such as copper, iron and the like, coated with silver and which act very much like solid silver particles, but which are less expensive. The size of the particles, may vary from 0.05 mil to 100 mils. Excellent results have been obtained utilizing particles in the 3–8 mils range. The size of the particles should vary according to the thickness of the body or pad, the amount of force desired to be exerted on the body, and the value of the current desired to be passed through the body. In general, the current which can be accommodated by a body is directly proportional to the size of the metal particles.

A typical molded body may have its nonconductive portion formed of silicone resin and catalyst in the ratio of 10 to 1 by weight and its conductive portion or portions formed of the same resin and catalyst, in the same weight ratio, but having a particle to silicone ratio of 6 to 1. The overall body may be of any desired area and of any desired thickness, such as 0.060 inch. It should be apparent, however, that the ratios and dimensions recited may be varied within rather wide limits depending on the particular characteristics the resulting body are to possess. When a sample of the conductive portion of a typical body is viewed under a microscope, the silicone rubber appears to encapsulate each metallic particle and isolate it from the others, but the rubber does not prevent relative movement of the particles. When the body is subjected to compressive forces and deformed or compressed, the metallic particles are forced to move relatively to one another and to the encapsulating rubber in such manner that a sufficient number of the particles move into engagement with one another to establish a conductive train or path through the body portion. Current then may flow through the conductive body portion. The low shear resistance of silicone rubber and the nonadherence of the rubber to the particles facilitate the movement of the particles. The resistance of the conductive body portion, when conductive, corresponds substantially to the resistance of the metal particles. Since the electrical resistance of noble metals, such as silver, is quite low, the resistance of the conductive portion also is quite low and, therefore, permits the latter to accommodate a high value current. For example, a conductive pad constructed of Dow Corning 3120 silicone rubber and containing 3-mil, silver coated copper particles in the ratio referred to above and having a thickness of 0.06 inch was sandwiched between conventional terminals and was capable of conducting a current of 50 amperes without impairment. Another, similar pad was incorporated in a 115-volt AC circuit including a 25-watt electric lamp bulb and was cycled at the rate of 130 cycles per minute. After more than 7 million cycles of operation, the pad still functioned perfectly.

It is believed that, when a conductive path is established through the conductive body portion, the current density of such path between the other circuit components is much less than that of the point-to-point contact of conventional metal-to-metal connectors. The resistance of the body portion, when conductive, has been measured to be 0.0025 ohms which is equivalent to the resistance of 4.7 inches of 18 gauge wire or 3 inches of 20 gauge wire.

When the compressive force applied to the conductive body portion is released, the inherent resilience of the silicone rubber causes the latter to expand and assume its normal, unstressed condition, whereupon the engaged conductive particles are forced to move out of engagement, thereby disestablishing or breaking the conductive path. If there should be any arcing between particles as they separate from one another, the arcing will be confined to the interior of the body. Even though the presence of an arc may destroy or impair the current conductive capacity of the particles between which the arc forms, there are so many particles in the body and, consequently, so many possible current conductive paths, that a potential path always exists through the body throughout its life expectancy. The presence of arcs within the body leaves a track, but because of the low carbon content of the silicone rubber the arcing track is composed of nonconductive inorganic matter, rather than a conductive carbon track such as would be left in organic materials.

Apparatus constructed in accordance with the embodiment of the invention illustrated in FIG. 1 comprises a body 1 formed of compressible, resilient, nonconductive, elastomeric material such as silicone rubber and which may be annular as shown or, if preferred, the body may comprise a disc. The body 1 may be formed by mixing a silicone resin with a suitable catalyst in a known manner and introducing the mixture to a mold. The mold preferably has a plurality of spaced apart ribs so taht the body 1, when formed, will have a corresponding plurality of windows or openigns 2 spaced around a central opening 3. Alternatively, the body 1 may be molded as a solid disc and the openings 2 and 3 formed in the body following curing of the latter. When the body 1 has been cured, the openings 2 may be filled with a mixture of silicone rubber like that from which the body is formed, but having dispersed therethrough a plurality of electrically conductive particles of the kind hereinbefore mentioned. Each of the openings 2 thus will form a mold for a pad or portion 4 which may be rendered selectively conductive or nonconductive as will be pointed out in more detail hereinafter. The portion 4 will bond itself to the body 1.

Figure 2:
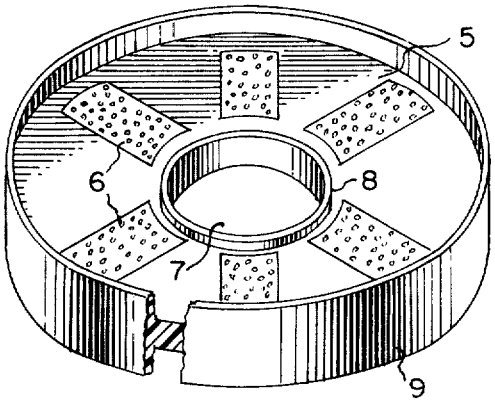
FIG. 2 is an isometric view, partly broken away, of another embodiment of a control device.

FIG. 2 illustrates an annular body 5 similar to the body 1 having conductive pads or portions 6 identical to the conductive portions 4 and spaced angularly about a central opening 7. The only difference between the bodies 1 and 5 is that the body 5 has upstanding flanges or ribs 8 and 9 at its inner and outer peripheries, respectively, which are molded integrally with the nonconductive portions of body 5. It will be understood that, although the flanges are illustrated as projecting beyond both surfaces of the body 5, the flanges could be formed in such manner as to extend beyond one surface only of the body.

Figure 6:
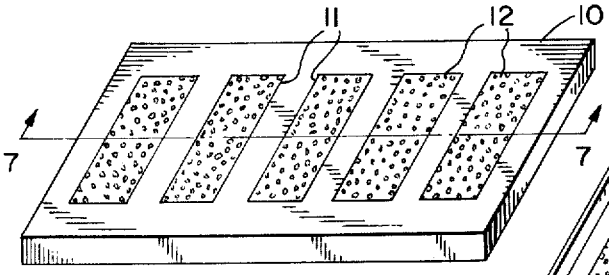
FIG. 6 is an isometric view of another embodiment of control device.

The body 10 illustrated in FIG. 6 is like the body 1, but is quadrangular and is flat on both surfaces. In the manufacture of the body 10 openings 11 are formed which subsequently are filled with material 12 constituting a mixture of the insulating material from which the body 10 is formed and electrically conductive particles of the kind hereinbefore described.

Figure 8:
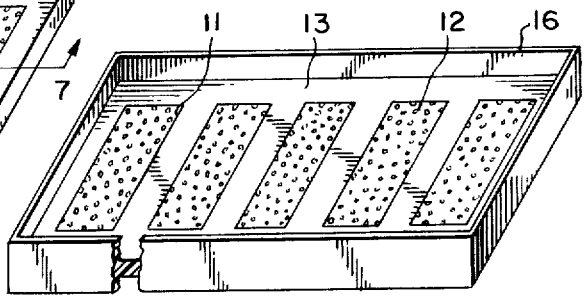
FIG. 8 is a view similar to FIG. 2, but illustrating still another embodiment of control device.
Figure 7:
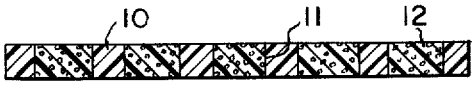
FIG. 7 is a sectional view taken on the line 7—7 of FIG. 6.

The body 13 illustrated in FIG. 8 is similar to the body 10 in that it is rectangular and has spaced apart openings 11 filled with a material 12 comprising a mixture of the insulating material and conductive particles. The body 13 differs from the body 10 in that the body 13 has an upstanding marginal rib or flange 16 extending from either or both surfaces of the body 13.

Figure 12:
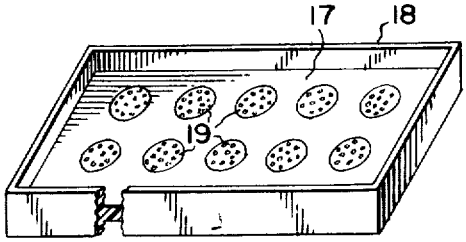
FIG. 12 is a view similar to FIG. 8, but illustrating another embodiment of control device.

FIG. 12 discloses a rectangular body 17 formed of insulating material like that described earlier and having a marginal rib or flange 18 which projects beyond either or both surfaces of the body. In the formation of the body 17, a plurality of aligned, spaced-apart pairs of preferably cylindrical openings 19 are provided, which openings subsequently are filled with the mixture of insulating material and conductive particles.

Figure 14:
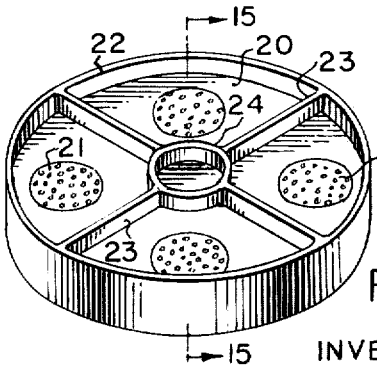
FIG. 14 is an isometric view of another embodiment of control device.
Figure 15:
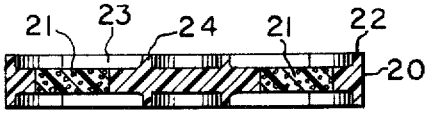
FIG. 15 is a sectional view taken on the line 15—15 of FIG. 14.

The body 20 illustrated in FIG. 14 is in the form of a disc and has a plurality of spaced-apart openings 21 containing the mixture of insulating material and conductive particles. The body 20 may have upstanding, peripheral ribs 22 and 24 and similar radial ribs 23 which isolate the conductive portions 21 from one another. The ribs 22, 23 and 24 may project from either or both surfaces of the body 20.

Figure 3:
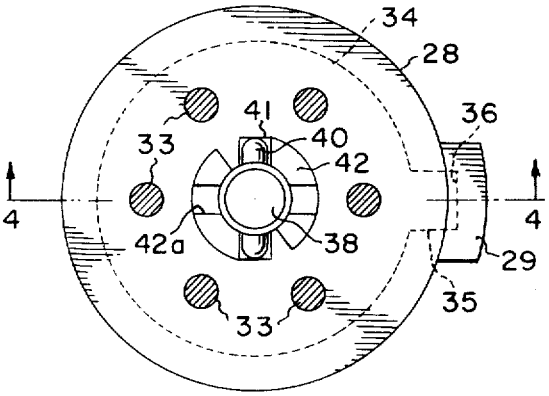
FIG. 3 is a view partly in top plan and partly in section of a connector in which either of the devices shown in FIGS. 1 and 2 may be used.
Figure 5:
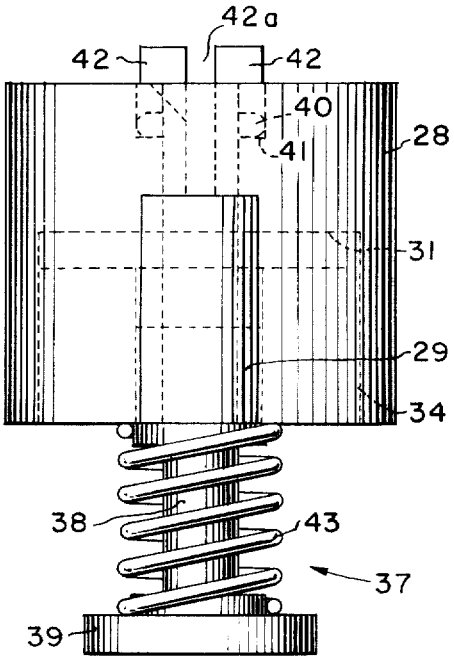
FIG. 5 is an elevational view of the conductor.

The several bodies disclosed herein can be used in conjunction with a large number of different kinds of electrical circuits and in conjunction with a large number of different kinds of coupling or connecting devices. One of such coupling devices is designated generally by the reference character 27 in FIGS. 3–5 and comprises a socket member 28 formed of insulating material having a cylindrical skirt 29 which defines an internal chamber 30 having a flat base 31. The member 28 has a central opening 32 around which is located a plurality of uniformly spaced, electrically conductive terminals 33, the inner ends of which preferably are flat and project slightly beyond the base 31 into the chamber 30.

The connector 27 also includes a carrier member 34 formed of insulating material having a plurality of terminals 35 corresponding to the number and spacing of the terminals 33, the inner ends of the terminals 35 also projecting slightly beyond the carrier 34. The carrier 34 is adapted to be fitted removably into the chamber 30, the carrier having a tongue 35 which may be accommodated in a groove 36 formed in the skirt 29 so as to assure alignment of the terminals 33 and 35.

The connector 27 includes means 37 for separably coupling the members 28 and 34 to another. The coupling means comprises a shaft 38 slidably mounted in the carrier 34 and adapted to extend through the opening 32 in the member 28. At one end the shaft 38 terminates in a finger piece 39 and at its other end is provided with a pair of transversely projecting arms 40 which are adapted to be received in seats 41 provided in the member 28. The opening 32 is of such size as to pass the arms 40 and the seats 41 are formed in blocks 42 that are spaced from one another by slots 43 so as to permit relative rotation of the shaft 38 and the member 28 and corresponding movement of the arms 40 from the slots 42a to the seats 41. The connector members 28 and 34 are biased toward one another by a spring 43 which acts between the finger piece 39 and the carrier 34. The spring thus urges the terminals 33 and 35 toward one another when the members 28 and 34 are assembled.

Figure 4:
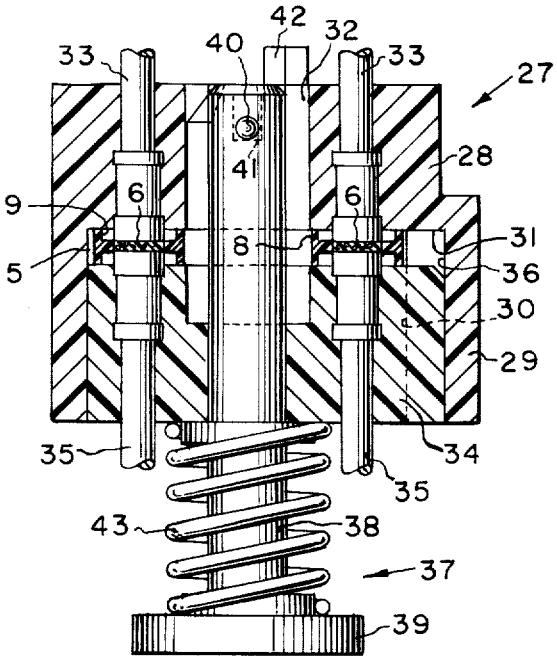
FIG. 4 is a sectional view taken on line 4—4 of FIG. 3.

Either of the current control bodies 1 or 5 may be used in conjunction with the coupling member 27. For purposes of illustration, the body 5 is shown in FIG. 4 and is interposed between the members 28 and 34 in such manner that the conductive portions 6 are sandwiched between the pairs of terminals 33 and 35. In these positions of the parts, the spring 43 causes the confronting terminals 33 and 35 to compress the conductive portions 6 of the body 5 with such force as to establish a conductive path between the confronting terminals via the conductive particles contained in the material 6. Each of the conductive portions, however, is isolated electrically from one another by the intervening insulating portion of the body 5.

Of particular significance is the ability of the conductive portions 6 to establish a current path between a pair of terminals 33 and 35 even though the latter are not in perfect alignment. In fact, misalignment to a considerable extent may be tolerated without degradation of the electrical conductivity between pairs of terminals.

When the body 5 is in the condition shown in FIG. 4, the flanges 8 and 9 also are compressed between the body members 28 and 34, thereby effecting a seal which completely surrounds the terminals 33 and 35 so as to shield the latter and the conductive portions 6 against contamination by moisture or other foreign matter.

Figure 9:
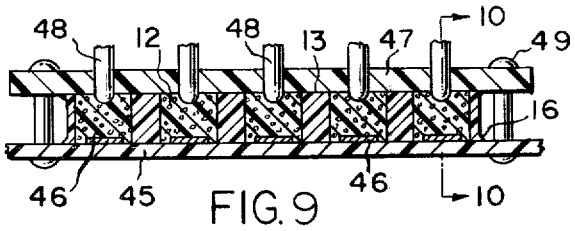
FIG. 9 is a sectional view illustrating a typical control device used as an interface between a printed circuit and wire conductors.
Figure 10:
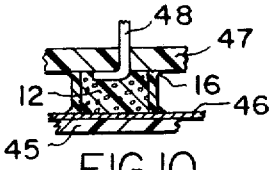
FIG. 10 is a sectional view taken on the line 10—10 of FIG. 9.

The apparatus shown in FIG. 9 comprises either a flexible or rigid printed circuit having a substrate 45 formed of insulating material and on the upper surface of which is a plurality of conductive strips 46 of the kind commonly found in printed circuits. Mounted atop the substrate 45 is the current control body 13, although the body 10 could be used equally well. The body 13 is so arranged that the conductive portions 12 lie atop exposed portions of the conductive strips 46. Atop the body 13 is a nonconductive carrier 47 provided with a plurality of rigid wire terminals 48 which extend through the carrier 47 so as to be engageable with the material 12 when the parts are assembled. The members 45 and 47 may be joined by screws 49 or the like so as to subject the body 13 to compression, the terminals 48 effecting sufficient compression of the portions 12 to render such portions conductive and thereby enable current to pass from the conductors 46 to the conductors 48. Each portion 12 of the body 13 is isolated from one another by the nonconductive material constituting the remaining portions of body 13. The flange 16 effects a seal around the entire body 13 so as to prevent the introduction of moisture or other foreign matter to the area of the printed circuit occupied by the body 13.

Figure 11:
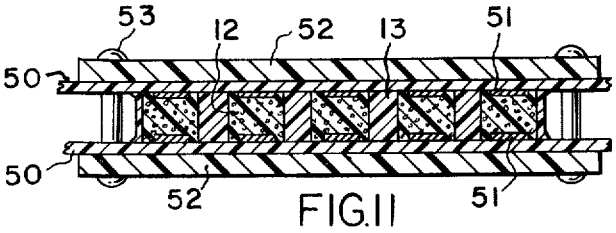
FIG. 11 is a view similar to FIG. 9 but illustrating the control device sandwiched between two printed circuits.

The apparatus shown in FIG. 11 is similar to the apparatus shown in FIG. 9, but differs from the latter in that the body 13 is sandwiched between a pair of flexible printed circuit members each of which includes a nonconductive substrate 50 and conductive strips 51. Suitable backing members 52 are associated with the printed circuit members and are maintained in assembled relation by means of screws 53 or the like and which subject the body 13 to sufficient compression as to render the portions 12 conductive, thereby permitting current to be conducted between the confronting conductors 51 of the two printed circuit members.

Figure 13:
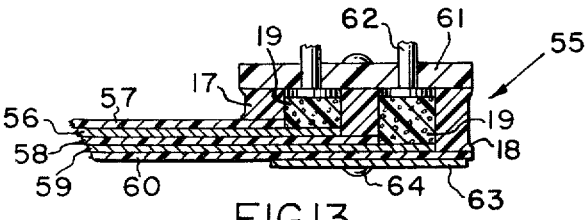
FIG. 13 is a view similar to FIG. 9, but illustrating the device of FIG. 12 used with a double-deck printed circuit.

FIG. 13 illustrates, in great exaggeration, a double-deck printed circuit assembly or unit 55 comprising one or more conductive strips 56 sandwiched between insulating layers 57 and 58 and other conductive strips 59 sandwiched between the layer 58 and a similar nonconductive layer 60. The strips 56 and 59 may overlie one another or otherwise be arranged in any desired manner. At one end of the unit 55 the insulating layer 57 is cut away to expose the conductive strips 56 and the layer 58 is cut away to expose the conductive strips 59. If the strips 56 and 59 overlie one another, as shown, the exposed portions of the strips are staggered.

Atop the unit 55 is placed the current control body 17 in such manner that one portion 19 of a pair of such portions overlies the exposed conductor 56 and the other portion 19 of the pair of portions overlies the exposed conductor 59. A carrier 61 provided with pairs of terminals 62 spaced apart according to the spacing of the portions 19 then is placed over the body 17, so that the terminals 62 of a pair thereof bear against the two corresponding portions 19. The carrier 61 is assembled with the unit 55 by means of a backing plate 63 and screws 64 which maintain the body 17 under such compression as to render the portions 19 conductive. The flange 18 seals the body 17 between the members 61 and 63 and against the unit 55 so as to prevent the entry of moisture and other foreign matter between the body 17 and the respective conductors.

The terminals 62, although shown as fixed elements, could constitute depressable contacts of a switch in which case the body 55 would not normally be compressed to the degree required to render the portions 19 conductive. Such portions could be rendered conductive, however, by depression of a contact 62 and consequent compression of the associated portion 19. The same observation applies equally to all of the other disclosed embodiments. Apparatus constructed according to the invention, therefore, lends itself admirably to on-circuit switch mechanisms associated with printed circuits.

In the preparation of any of the body members herein disclosed the current control portions thereof may be normally nonconductive or normally conductive. Whether the body members have normally conductive or normally nonconductive portions will depend upon several factors such as the thickness of the body, the concentration of the conductive particles, the size of the conductive particles, and whether or not the conductive portions are molded under pressure or are molded without being subjected to compressive forces.

If a particular body has its conductive portion or portions molded under pressure in such manner as normally to be conductive, then the application of external pressure on the body is not required. On the other hand, if the conductive portion of a body is molded in such manner as normally to be nonconductive, then external pressure must be applied on that portion to render it conductive.

Whether or not some portion of a body is normally conductive or normally nonconductive will depend upon the use to which the body is to be put. For example, the apparatus 27 may have the characteristics of either a manually or automatically resettable circuit breaker. In such a case, it is preferred that the conductive particles of the portions 6 normally be disengaged, thereby necessitating compression of such portions by means of the spring to render them conductive. In the compression of the portions 6, the normally disengaged conductive particles will be moved relatively to one another so as to establish at least one train of engaged particles through the portions 6, thereby establishing a conductive path between the confronting terminals 33 and 35. Should an excessive current then be passed through the portions 6, the engaged particles constituting the current path will be heated, and possibly consumed, thereby breaking the circuit continuity between the confronting terminals 33 and 35.

The excessive current and the consumption of the engaged particles will generate a certain amount of heat which will be absorbed by the insulating material in which the conductive particles are contained. If the material has a coefficient of thermal expansion greater than that of the conductive particles, as is the case with silicone rubber and silver coated, copper particles, the heat generated by the excessive current will cause the nonconductive material to expand, as is permitted by the spring 43, thereby effecting disengagement of the particles. If the spring force under which the portions 6 are compressed is relatively light, the contraction of the portions 6 during cooling will not be sufficient to reestablish a conductive path through the portions 6. The portions 6 may be rendered conductive again by applying compressive force on the coupling members 28 and 34 manually. However, the force of the spring 43 may be such as to assure compression of the portions 6 following their cooling by an amount such as to force other conductive particles into engagement and reestablish electrical continuity through the portions 6. Thus, the apparatus may constitute either a manually resettable or an automatically resettable circuit breaker.

When a body member is adapted to function as a thermostat, the conductive portion or portions thereof will be formed under sufficient pressure as normally to be conductive. When the temperature of the body is raised, either by heat generated by an electric current or by an increase in ambient temperature, the thermal expansion of the nonconductive material will effect separation of the conductive particles so as to render the body nonconductive. When the body cools, however, it will contract whereupon the conductive particles again will be engaged with one another so as to reestablish circuit continuity through the body.

The ability of any of the several composite bodies disclosed herein to serve as an interface between rigid terminals of a coupling, between rigid terminals and either rigid or flexible printed circuits, and between printed circuits themselves enables a great many production and assembly problems associated with switchgear to be solved. For example, the coupling device 27 can be used in lieu of pin and socket type couplers, thereby avoiding the problems associated with alignment of the pins with the sockets. Moreover, a body such as the body 13 can be interposed between two parts an assembly intended to be fastened together and carrying conductors which must be joined to one another. In such a case the conductive portions of the body may be aligned within reasonable limits with the other conductors, whereupon fastening of parts of the assembly automatically will effect compression of the conductive body portions and establish circuit continuity. In effect, therefore, the body enables parts of an assembly to be self-wiring upon their being fitted together.

The apparatus and methods disclosed are representative of presently preferred embodiments thereof, but are intended to be illustrative rather than definitive thereof. The invention is defined in the claims.

I claim:

1. Current control apparatus comprises a body formed of electrically nonconductive, resiliently compressible material, said body having at least one opening extending therethrough; and at least one composite pad occupying said opening and adhered to said body, said pad being formed of resiliently compressible, electrically nonconductive material having discrete, electrically conductive particles dispersed therethrough, said particles being responsive to compression of said pad to establish an electrically conductive path through said pad, said pad being exposed at opposite sides of said body for engagement with conductors.

2. The apparatus set forth in claim 1 wherein the resilience of said material of said pad is such as to disable said particles from establishing said conductive path except when said material of said pad is compressed.

3. The apparatus set forth in claim 1 wherein said material of said pad has a thermal coefficient of expansion different from the thermal coefficient of expansion of said particles whereby said material and said particles expand and contract at different rates in response to changes in temperature.

4. The apparatus as set forth in claim 1 wherein the nonconductive material of said pad is the same as the material of said body.

5. The apparatus set forth in claim 1 wherein said body has an upstanding, deformable endless flange at least at one side thereof and encircling said pad.

6. The apparatus set forth in claim 1 wherein said body has an upstanding, deformable endless flange on each of its said two opposite sides and encircling said pad.

7. The apparatus set forth in claim 1 wherein said body has a plurality of spaced-apart openings therethrough and in each of which is adhered one of said pads, each of said openings being solated from one another by the material forming said body.

8. The apparatus set forth in claim 7 wherein said pads are solated from one another by upstanding resilient ribs.

9. The apparatus set forth in claim 7 wherein the height of each of said pads is at least as great as the thickness of said body.

10. The apparatus set forth in claim 1 including an upstanding deformable endless rib at least at one side of said body and encircling all of said pads.

11. The apparatus set forth in claim 10 including additional ribs upstanding at said one side of said body and cooperating with the first-mentioned rib to encircle each of said pads.

12. The apparatus set forth in claim 7 including an upstanding, deformable, endless rib on both sides of said body, each of said ribs encircling all of said pads.

13. The apparatus set forth in claim 1 wherein said body is quadrangular.

14. The apparatus set forth in claim 1 wherein said body is circular.

15. The apparatus set forth in claim 1 wherein said body is annular.

16. The apparatus set forth in claim 1 including a conductor in engagement with said pad; and means for pressing said conductor against said pad with sufficient force to render said pad electrically conductive.

17. The apparatus set forth in claim 16 wherein said pressing means comprises a pair of members sandwiching said body therebetween; and means for clamping said members to one another under sufficient force to cause said conductor to compress said pad.

18. The apparatus set forth in claim 17 wherein said clamping means includes a spring.

19. The apparatus set forth in claim 16 wherein said conductor constitutes part of a printed circuit.

20. The apparatus set forth in claim 18 wherein said printed circuit is flexible.

21. The apparatus set forth in claim 1 wherein said pad has an inherent compression such as to render it conductive without the application of external compressive force.

22. The apparatus set forth in claim 1 wherein the coefficient of thermal expansion of the nonconductive material of said pad is greater than the thermal coefficient of expansion of said conductive particles.

23. A method of forming current control apparatus comprising molding a nonconductive material into a form-stable, resilient body having at least one opening therethrough; and occupying said opening with a molded form-stable composite substance adhered to said body and comprising nonconductive material having conductive particles dispersed therethrough.

24. The method set forth in claim 23 wherein said opening is formed during the molding of said body.

25. The method set forth in claim 23 wherein said opening is formed following the molding of said body.

26. The method set forth in claim 23 wherein said composite substance is molded under pressure sufficient to maintain said particles in engagement one with another.

27. The method set forth in claim 23 wherein said composite substance is molded under pressure insufficient to maintain said particles in engagement with one another in the absence of the application of an external compressive force on said substance.

28. The method set forth in claim 23 wherein the nonconductive material of said body is the same as the nonconductive material of said composite substance.

29. The method set forth in claim 23 wherein said composite substance is molded in place in said opening.

30. The method set forth in claim 23 including providing an upstanding endless rib at least at one side of said body and encircling said opening.

31. The method set forth in claim 23 including providing an upstanding endless rib at opposite sides of said body and encircling said opening at the opposite ends thereof.

*32. Current control apparatus comprising a body formed of electrically non-conductive, resiliently compressible material, said body having at least one opening extending therethrough; and at least one composite pad fitted into said opening, said pad being formed of resiliently compressible, electrically non-conductive material having discrete, electrically conductive particles dispersed therethrough, said particles being responsive to compression of said pad to establish an electrically conductive path through said pad, said pad being exposed at opposite sides of said body for engagement with conductors.*

*33. A method of forming current control apparatus comprising molding a non-conductive material into a formstable, resilient body having at least one opening therethrough; and fitting into said opening a molded, formstable, composite substance comprising non-conductive material having conductive particles dispersed therethrough.*

*34. Electrical interconnecting apparatus comprising a dielectric material having first and second opposite surface areas and having at least one hole extending through the dielectric material from the first surface area to the second surface area, at least one elastomeric compressible resilient electroconductive element disposed in the hole, the at least one element comprising a dielectric resin containing discrete electrical conductors held in electrical conducting relationship in the element.*

*35. The electrical interconnecting apparatus of claim 34 wherein the dielectric material has a plurality of holes therein and wherein the at least one element comprises a plurality of elements disposed within the holes for electrically connecting a plurality of first contacts adjacent the first surface area of the material with a plurality of second contacts adjacent the second surface area of the material.*

*36. The electrical interconnecting apparatus of claim 34 wherein the dielectric material comprises a resin.*

*37. The electrical interconnecting apparatus of claim 34 wherein the dielectric material comprises a flexible, thin resin sheet.*

*38. The electrical interconnecting apparatus of claim 34 wherein the dielectric material comprises a thin resilient resin sheet.*

*39. The electrical interconnecting apparatus of claim 34 wherein the dielectric material comprises a flexible resilient and compressible resin sheet having first and second opposite faces and having a plurality of holes extending through the sheet, and wherein the at least one electroconductive elements comprises a plurality of elastomeric rods disposed in the holes, the rods having electroconductors therein whereby a plurality of contacts adjacent the first face are electrically connected with a plurality of contacts adjacent the second face.*

*40. The electrical connecting apparatus of claim 39 wherein each rod has a plurality of relatively small discreet conductors held by the elastomeric rods in electrical conducting relation which is enhanced by compressing the rods between contacts adjacent the sheet faces.*

*41. The electrical interconnecting apparatus of claim 34 further comprising first contact bearing means adjacent the first surface area and having positioned thereon at least one first contact ajdacent the at least one element, and second contact holding means adjacent the second surface area and having a second contact adjacent*

*the at least one element and means pressing the first and second contact means inward thereby tending to compress the at least one element and completing an electrical circuit between the first and second contacts.*

*42. The apparatus of claim 34 wherein the element extends from one surface of the dielectric material to an opposite surface thereof.*

*43. The method of joining electrical contacts comprising positioning contacts opposite each other, interposing a dielectric retainer having a conductive elastomeric element extending therethrough between the contacts and pressing the contacts towards each other, thereby compressing the conductive elastomeric element and completing a circuit between the contacts.*

* * * * *

UNITED STATES PATENT AND TRADEMARK OFFICE

CERTIFICATE OF CORRECTION

PATENT NO. : Re. 28,595

DATED : October 28, 1975

INVENTOR(S) : Gideon A. DuRocher

It is certified that error appears in the above-identified patent and that said Letters Patent are hereby corrected as shown below:

Column 2, line 6, change "conductor" to --connector--.

Column 5, line 54, change "taht" to --that--.

Column 5, line 55, change "openigns" to --openings--.

Column 8, line 36, delete "," after "17".

Column 10, line 57, change "solated" to --isolated--.

Column 10, line 60, change "solated" to --isolated--.

Column 11, line 41, after "molded" insert --,--; after "form-stable" insert --,--; and after "composite" delete "substance".

Column 12, line 3, change "comprising" to --comprises--.

Signed and Sealed this

*tenth* Day of *February 1976*

[SEAL]

*Attest:*

RUTH C. MASON
*Attesting Officer*

C. MARSHALL DANN
*Commissioner of Patents and Trademarks*